US006192499B1

(12) United States Patent
Yang

(10) Patent No.: US 6,192,499 B1
(45) Date of Patent: Feb. 20, 2001

(54) DEVICE AND METHOD FOR EXTENDING ERROR CORRECTION BEYOND ONE SECTOR TIME

(75) Inventor: Honda Yang, Santa Clara, CA (US)

(73) Assignee: Adaptec, Inc., Milpitas, CA (US)

( * ) Notice: Under 35 U.S.C. 154(b), the term of this patent shall be extended for 0 days.

(21) Appl. No.: 09/087,731

(22) Filed: May 29, 1998

(51) Int. Cl.$^7$ .................................................. H03M 13/00
(52) U.S. Cl. .......................................................... 714/785
(58) Field of Search ..................................... 714/769, 765, 714/793, 785, 759, 746

(56) References Cited

U.S. PATENT DOCUMENTS

| 5,701,314 | 12/1997 | Armstrong et al. | 371/40.3 |
| 5,719,884 | 2/1998 | Roth et al. | 371/37.4 |
| 5,805,617 | 9/1998 | Im | 371/37.12 |
| 5,812,564 | * 9/1998 | Bonke et al. | 714/763 |
| 5,844,919 | * 12/1998 | Glover et al. | 714/769 |
| 5,844,920 | * 12/1998 | Zook et al. | 714/769 |
| 5,926,490 | * 7/1999 | Reed et al. | 714/787 |

OTHER PUBLICATIONS

S. Lin and D. Costello, Jr., "Error Control Coding", Published Oct. 1982, © 1983, Prentice Hall, Inc. Englewood Cliffs, NJ, pp. 167–174.
Unknown, "Chapter 1, Introduction".
S. Wilson, "Digital Modulation and Coding", 1996, Ch. 5, pp. 470–472, Prentice–Hall, NJ.

N. Glover and T. Dudley, "Practical Error Correction Design for Engineers", 1991, Cirrus Logic, Inc., CO, Rev. $2^{nd}$ Ed.
W.W. Peterson and E.J. Weldon, Jr., "Error–Correcting Codes", 1972, ($12^{th}$ printing 1994), Mass, Inst. Of Technology, pp. 131–136.
S.B. Wicker, "Error Control Systems for Digital Communication and Storage", CH. 9, "The Decoding of BCH and Reed–Solomon Codes", pp. 203–234, 1995 Prentice Hall, NJ.

* cited by examiner

Primary Examiner—Albert De Cady
Assistant Examiner—Shelly A Chase
(74) Attorney, Agent, or Firm—Martine Penilla & Kim, LLP

(57) ABSTRACT

Disclosed is an error detection and correction device for extending error correction time on a data sector beyond the time to receive a next data sector. The error detection and correction device is coupled to sequentially receive a plurality data sectors from a data storage medium. The device includes a buffer and error detection and correction circuitry. The buffer is configured to sequentially receive and store the plurality of data sectors from the data storage medium. The error detection and correction circuitry is configured to sequentially receive the data sectors for sequentially detecting errors in each of the received data sectors. The error detection and correction circuitry corrects the detected errors in the associated sector that is stored in the buffer beyond the time to receive a next data sector in sequence.

63 Claims, 8 Drawing Sheets

DEVICE AND METHOD FOR EXTENDING ERROR CORRECTION BEYOND ONE SECTOR TIME

BACKGROUND OF THE INVENTION

1. Field of the Invention

This invention relates generally to hard disk error correction code decoders, and more particularly to devices for extending error correction beyond a sector time.

2. Description of the Related Art

Modem computer systems typically include one or more hard disk drives to store large amount of data and programs. As a mass storage device, hard disk drives can provide information to the processors in the computer systems through random access memory (RAM) circuitry such as dynamic random access memory (DRAM), static random access memory (SRAM), etc. Since RAM circuitry is costly, storing information in a hard disk and retrieving the information as needed is generally far more economical than using comparable RAM circuitry for most computer applications.

Hard disk drives typically store information in sequence by using magnetic technology. Like most recording technology, reading the sequential data bits from a hard disk often generates errors due to noise, manufacturing imperfections of the physical medium, dust, etc. To detect and correct such errors, hard disk drives typically implement an error correction code (ECC) scheme in writing to and reading from hard disk drives.

Conventional ECC devices and methods typically employ well known codes such as Reed-Solomon code to encode user data for reliable recovery of the original data. Modern hard disk drives generally employ Reed-Solomon error correction code for correcting burst errors. This helps to achieve a higher areal density.

Traditional ECC schemes typically compute ECC bytes for a given block of user data such as a sector. Then, the computed ECC bytes are appended to the sector of user data and then recorded on a hard disk medium. Each sector typically contains 512 bytes of user data and additional ECC check bytes appended to the user data bytes. Each sector includes a sync pattern or bytes for identifying the beginning of the sector. The sync pattern or bytes are thus used to delineate a sector boundary. When the recorded sectors of data are read from the hard disk, the ECC scheme decodes the received sector data including the ECC bytes by generating syndromes for the received data in each of the sectors. Zero syndromes indicate that no error has been detected in the sector while non-zero syndromes indicate that one or more errors have been detected in the sector. For each of the sectors with non-zero syndromes, error locations and error patterns are determined and based on these information, the detected errors in the sector are corrected.

In conventional ECC devices, when data is read off from hard disk media, the data are typically stored in a temporary buffer for error detection and correction. During this time, on-the-fly error correction is performed on the data in the temporary buffer. To keep data flow uninterrupted, traditional ECC devices generally implement a high level pipeline scheme where sectors are continuously read and processed. That is, after sector 1 is placed in the temporary buffer, sector 2 is continuously read while error correction is performed on the data held in the temporary buffer. After errors, if any, have been detected and corrected, the data in the buffer is transferred to a host computer.

Given this constraint, conventional ECC devices and methods have typically required that the latency of error correction performed on any given sector be completed within one sector time, i.e., the time it takes to read or receive a sector. Prior Art FIG. 1 illustrates a block diagram of a conventional computer system 100 including a host computer 114 and a hard disk drive (HDD) 102. The host computer is coupled to the hard disk drive 102 to receive user or ECC decoded data. The hard disk drive 102 includes hard disk media 106, a hard disk controller (HDC) 104, and a buffer 112.

In this configuration, data stored in the sectors (e.g., S1, S2, S3, S4, and so on) are read sequentially as a data stream from the hard disk media 106 and transmitted to the hard disk controller 104. The hard disk controller 104 includes a disk manager 108 and an ECC decoder 110. The disk manager 108 sequentially receives the serial data and converts (e.g., deserialize) the data into a series of sectors (e.g., S1, S2, S3, S4, and so on), each of which typically contains 512 bytes of user data and additional ECC bytes appended to the user data bytes. In particular, the disk manager 108 detects sync pattern or bytes to identify or delineate each of the sectors sequentially from the received data stream. The disk manager 108 then transmits the sector data of the identified sector sequentially to the ECC decoder 110 and the buffer 112 concurrently. The ECC decoder 110 generates syndromes for the identified sector on-the-fly. The buffer 112 stores the sector data as the ECC decoder 110 is generating syndromes.

As defined herein, the time it takes to receive an entire sector in the buffer 112 is referred to as a "sector time." One sector time can also refer to the time for the ECC decoder 110 to receive data and generate syndromes for the identified sector. For real time or on-the-fly error correction, these two sector times will typically be the same. In this manner, when the ECC decoder 110 has finished generating the syndromes for the current sector, the it can determine error locations and patterns to correct detected errors, if any, in the current sector stored in the buffer 112 while the next sector is being received. After determining the error locations and patterns, the ECC decoder 110 corrects the errors in the stored data in the buffer 112 using the error locations and error patterns. The corrected data is then transmitted to the host computer 114.

For example, the ECC decoder 110 receives sector S1 from the disk manager 108 and generates syndromes for sector S1 during one sector time. The buffer 112 concurrently receives and stores sector S1. Upon receiving all the data for sector S1, the ECC decoder 110 receives the next sector S2 and generates the associated syndromes. The buffer 112 concurrently receives and stores sector S2. While receiving next sector S2, the ECC decoder 110 generates error patterns (i.e., values) and locations and performs error correction on received sector S1 stored in the buffer 112. To ensure sustained data flow, the error correction on sector S1 is typically limited to one sector time.

However, if error correction does not complete within one sector time, an error condition is generated indicating error correction overrun. For example, in ECC schemes, it is often desirable to implement a higher correction power by increasing the number of errors detected and corrected. Unfortunately, as the desired ECC correction power increases, the time for the ECC decoder 108 to process an ECC algorithm will likely increase. Further, the higher correction power will typically require more data access to the buffer 112, resulting in further delays. In addition, the buffer 112 often is not dedicated to the exclusive use of the ECC decoder 108. For example, the buffer 112 can be shared among multiple ports such as the host computer 114, the hard disk drive 102, dynamic random-access-memory (DRAM) refresh, etc.

When the bandwidth requirements increase on a host bus and hard disk data transfer rate, the buffer bandwidth may become a bottleneck for the ECC decoder 112. In these cases, the error correction in the buffer 112 typically may not be completed within one sector time. When the error correction thus extends beyond the allocated one sector time, the data transfer is interrupted since the ECC decoder 110 is no longer capable of handling sustained data flow. In these instances, the hard disk controller 104 generates an error event often called "correction overrun" and stops reading data from the hard disk media 106. The hard disk controller 104 may then process the error and re-read the interrupted sector by waiting for the hard disk media 106 to make another revolution to the beginning of the sector. Such interruption of data flow thus causes undesirable delays and performance penalties.

One solution to this problem is to implement an ultra fast ECC decoder to ensure that the worst case buffer access latency is within the allotted one sector time. This approach, however, would require complex and expensive hardware resources for implementing the ECC decoder. Another solution may be to integrate an on-chip sector buffer so that error correction on an external buffer is eliminated. However, the on-chip sector buffer solution would require, among other circuitry, at least two costly dedicated sector buffers.

Thus, what is needed is a cost effective device and method that can extend error correction beyond a sector time without interrupting data flow. What is further needed is an extended error correction device and method that can be implemented without integrating costly hardware resources.

SUMMARY OF THE INVENTION

Broadly speaking, the present invention fills these needs by providing a device, a method, and a system for extending error correction beyond one sector time. It should be appreciated that the present invention can be implemented in numerous ways, including as a process, an apparatus, a system, a device, a method, or a computer readable medium. Several inventive embodiments of the present invention are described below.

In one embodiment, the present invention provides an error detection and correction device for extending error correction time on a data sector beyond the time to receive a next data sector without interrupting data flow. The error detection and correction device is coupled to sequentially receive a plurality data sectors from a data storage medium. The device includes a buffer and error detection and correction circuitry. The buffer is configured to sequentially receive and store the plurality of data sectors from the data storage medium. The error detection and correction circuitry is configured to sequentially receive the data sectors for sequentially detecting errors in each of the received data sectors. The error detection and correction circuitry corrects the detected errors in the associated sector that is stored in the buffer beyond the time to receive a next data sector in sequence.

In another embodiment, the present invention provides a method for extending error correction time on a data sector beyond the time to receive a next data sector. In this method, a plurality of data sectors are sequentially received from a data storage medium for storage in a buffer. The method includes a) sequentially receiving and storing a first data sector and detecting a first set of errors in the first data sector; b) sequentially receiving and storing a second data sector and detecting a second set of errors in the second data sector; c) while receiving the second data sector, determining a first set of error locations and patterns associated with the detected first set of errors in the first data sector; d) sequentially receiving and storing a third data sector and detecting a third set of errors in the third data sector; and e) while receiving the third data sector, correcting the detected first set of errors in the first data sector; and determining a second set of error locations and patterns associated with the detected second set of errors in the second data sector.

In yet another embodiment, an error detection and correction device includes a buffering means and error detecting and correcting means. The buffering means is configured to sequentially receive and store the plurality of data sectors from the data storage medium. The error detecting and correcting means is configured to sequentially receive the data sectors for sequentially detecting errors in each of the received data sectors. The error detecting and correcting means corrects the detected errors in the associated sector that is stored in the buffer beyond the time to receive a next data sector in sequence.

In still another embodiment, a system for extending error correction time on a data sector of an error correction coded data stream beyond the time to receive a next data sector. The error correction coded data stream is read from a data storage medium and comprises a plurality of data sectors. The system includes a disk manager circuitry, a buffer, and error detection and correction circuitry. The disk manager circuitry is configured to receive the data stream for sequentially identifying the plurality of data sectors in the data stream. The buffer is coupled to the disk manager circuitry for sequentially receiving and storing the plurality of data sectors from the data storage medium. The error detection and correction circuitry configured to sequentially receive the data sectors from the disk manager circuitry for sequentially detecting errors in each of the received data sectors. The error detection and correction circuitry corrects the detected errors in the associated sector that is stored in the buffer beyond the time to receive a next data sector in sequence.

Advantageously, the present invention extends error correction time on a sector beyond the time to receive the next sector. Such extension of correction time provides not only more time to perform error corrections but also alleviates the buffer access bottleneck. Furthermore, the device, method, and system of the present invention extends error correction time without the cost of expensive hardware resources by using a relatively small FIFO buffer. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

Prior Art

Detailed Description of the Preferred Embodiments

An invention is described for device, method, and system for extending error correction beyond one sector time without interrupting data flow. It will be obvious, however, to one skilled in the art, that the present invention may be practiced without some or all of these specific details. In other instances, well known process operations have not been described in detail in order not to unnecessarily obscure the present invention.

Figure 1:
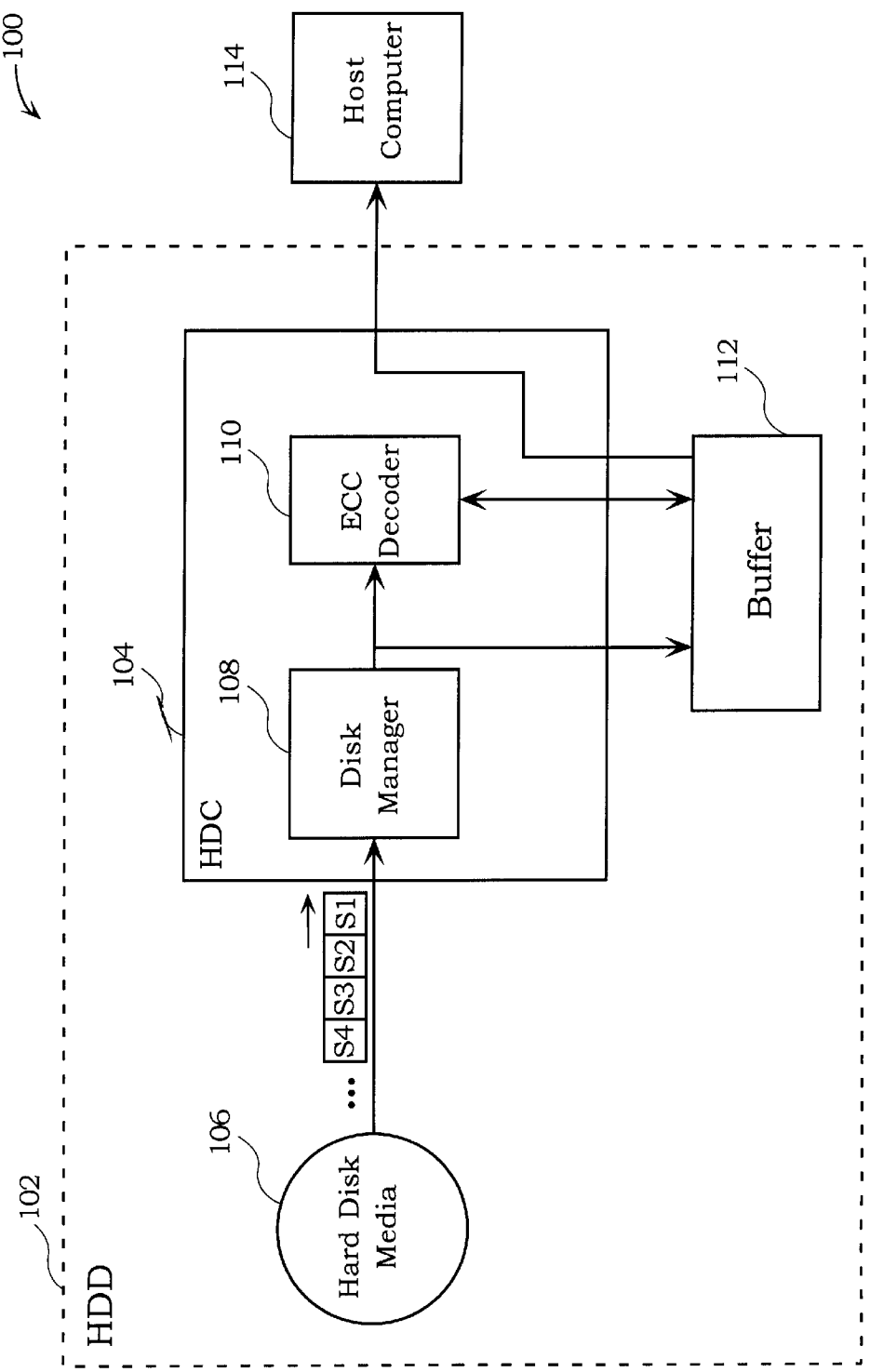
FIG. 1 illustrates a block diagram of a conventional computer system including a host computer and a hard disk drive.
Figure 2:
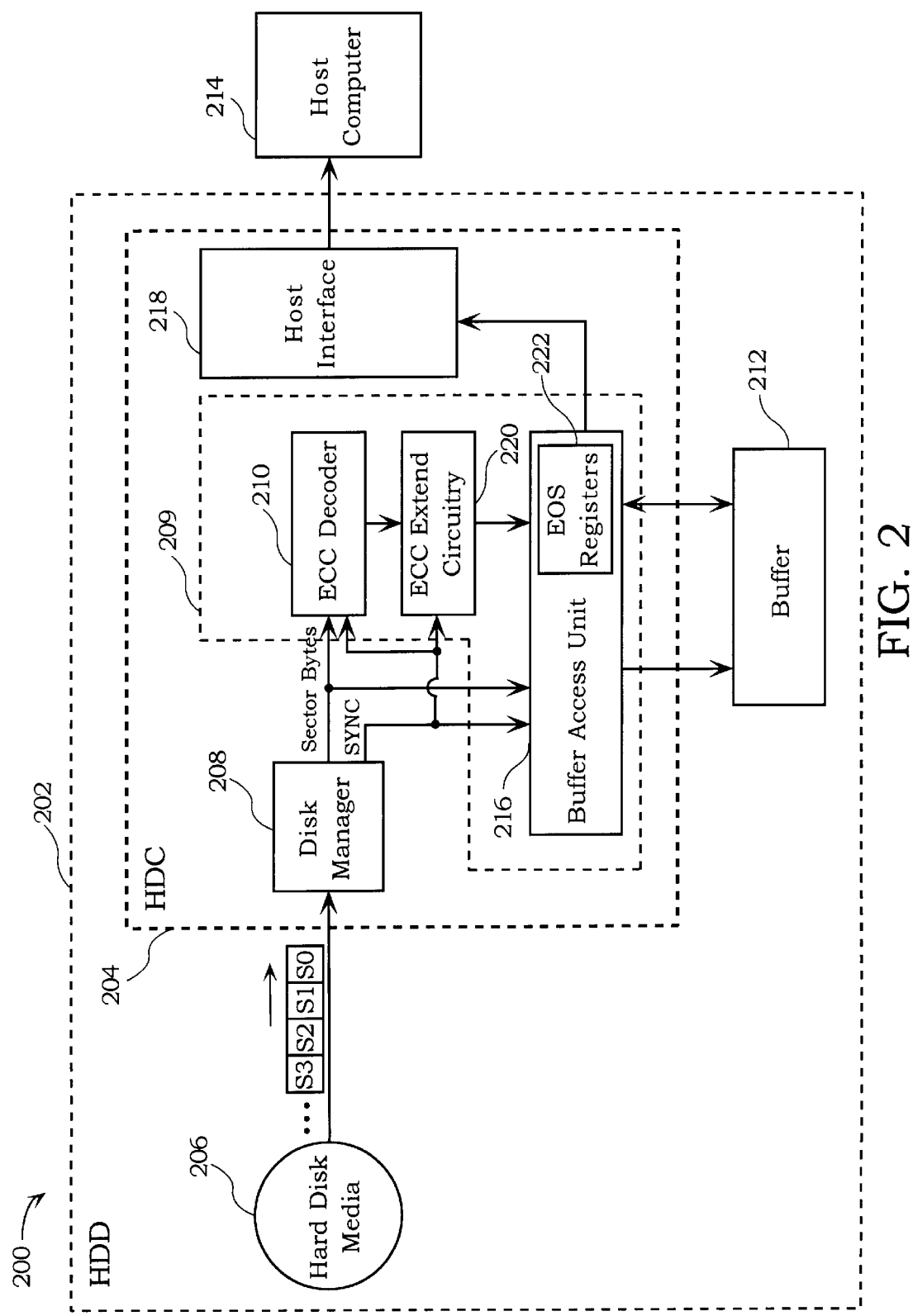
FIG. 2 illustrates a computer system including a host computer and a hard disk drive.

FIG. 2 illustrates a computer system 200 including a host computer 214 and a hard disk drive (HDD) 202. The host computer 214 is coupled to the hard disk drive 202 to receive user or ECC decoded data. The hard disk drive 202 includes hard disk media 206, a hard disk controller (HDC) 204, and a buffer 212. In this configuration, ECC encoded data sectors (e.g., S0, S1, S2, S3, etc.) are read sequentially as a data stream from the hard disk media 206 and transmitted to the hard disk controller 204. The hard disk controller 204 includes a disk manager 208, an ECC decoder 210, ECC extend circuitry 220, a buffer access unit 216, and a host interface 218.

The ECC decoder 210, the ECC extend circuitry 220, and the buffer access unit 216 together comprise error detection and correction (EDAC) circuitry 209. The disk manager 208 sequentially receives the stream of ECC encoded sector data and identifies each of the sectors (e.g., S0, S1, S2, S3, etc.) by detecting a sync pattern or sync bytes at the beginning of each of the sectors on-the-fly. Upon identifying a sector, the disk manager 208 generates a SYNC signal, which indicates the detection of a new sector. The disk manager 208 then transmits the SYNC signal and the individual bytes of each identified sector sequentially on-the-fly to the ECC decoder 210, the ECC extend circuitry 220, and the buffer access unit 216. In a preferred embodiment, the disk manager 208 transmits the data bytes to the ECC decoder 210 and the buffer access unit 216 concurrently and in parallel.

The ECC decoder 210 is coupled to the disk manager 208 to sequentially receive the bytes of the identified sequence of sectors on-the-fly. When all the bytes of a current sector have been received, the ECC decoder 210 generates partial syndromes for the current sector (e.g., S0). The generated partial syndromes indicate whether an error is present in the current sector. For example, a zero syndrome indicates that no error has been detected. On the other hand, a non-zero syndrome indicates that one or more errors have been detected in the received data.

From the generated syndromes for the current sector, the ECC decoder 210 determines errors, if any, in the current sector during the next sector time. In particular, the ECC decoder 210 generates error locations, error patterns, and control information bits for the current sector. At the same time, the ECC decoder 210 receives the next sector and generates the associated syndromes.

As the ECC decoder 210 is receiving the bytes of an identified sector (e.g., S0), the buffer access unit 216 receives the bytes of the sector (e.g., S0) concurrently in parallel and stores the received bytes in the buffer 212. The buffer access unit 216 additionally provides interface functions for accessing the buffer 212. The buffer access unit 216 also includes a counter for identifying the end-of-sector (EOS) or last byte of a sector by counting from the first byte to the last byte of the sector. For example, since a sector includes 512 bytes, the buffer access unit 216 counts 512 bytes to determine the last byte. In a preferred embodiment of the present invention, the buffer access unit 216 includes a pair of EOS pointer registers 222 for storing a pair of EOS pointers to the addresses in the buffer 212. These two pointer registers 222 are used to store or point to the addresses of the last bytes of two consecutive sectors, i.e., EOS byte addresses, in the buffer 212. The two EOS pointers in this embodiment enable error correction to be extended up to two sector time. Although one embodiment of present invention employs two EOS pointers, it is to be appreciated that the present invention can also utilize more than two EOS pointer registers to extend error correction to more than two sector time. For instance, three EOS pointers can be used to extend error correction to three sector time in a similar manner, and so on.

Therefore, in accordance with one embodiment, the two EOS pointers, EOS1 and EOS2, support error correction in the buffer 212 up to two sector time. Specifically, when the last byte of the sector (e.g., S0) has been received and stored in the buffer 212, the buffer access unit 216 sets one of the EOS pointers, (e.g., first EOS pointer) to the last byte address of the sector stored in the buffer 212. Then, when the last byte of a next sector (e.g., S1) is received and stored in the buffer 212, the buffer access unit 216 sets the other pointer (e.g., second EOS pointer) to the last byte address of the next sector (e.g., S1) in the buffer 212. When a new next sector (e.g., S2) is received in the buffer 212, the buffer access unit 216 sets the first EOS pointer to the last byte address of the next sector (e.g., S2) in the buffer 212. The EOS pointers are thus set in a "ping-pong" fashion.

To enable extended error correction, the ECC extend circuitry 220 is coupled to receive error locations (EL), error patterns (EP), and control information bits from the ECC decoder 210. The ECC extend circuitry 220 includes a first-in-first-out (FIFO) buffer, which is designed to decouple the ECC decoder 210 from the buffer 212 and thereby extend error correction beyond one sector time.

In accordance with one embodiment, the ECC extend circuitry 220 writes or stores error locations, error patterns, and control information bits to enable error correction beyond one sector time. The buffer access unit 216 then reads the error locations, error patterns, and control information bits from the FIFO buffer to access the data stored in the buffer 212 as indicated by the error locations synchronously with the EOS pointers for error correction. After error correction and in the absence of detection of uncorrectable errors, the corrected sector may be transmitted or released to the host computer 214 through the host interface 218.

Figure 3:
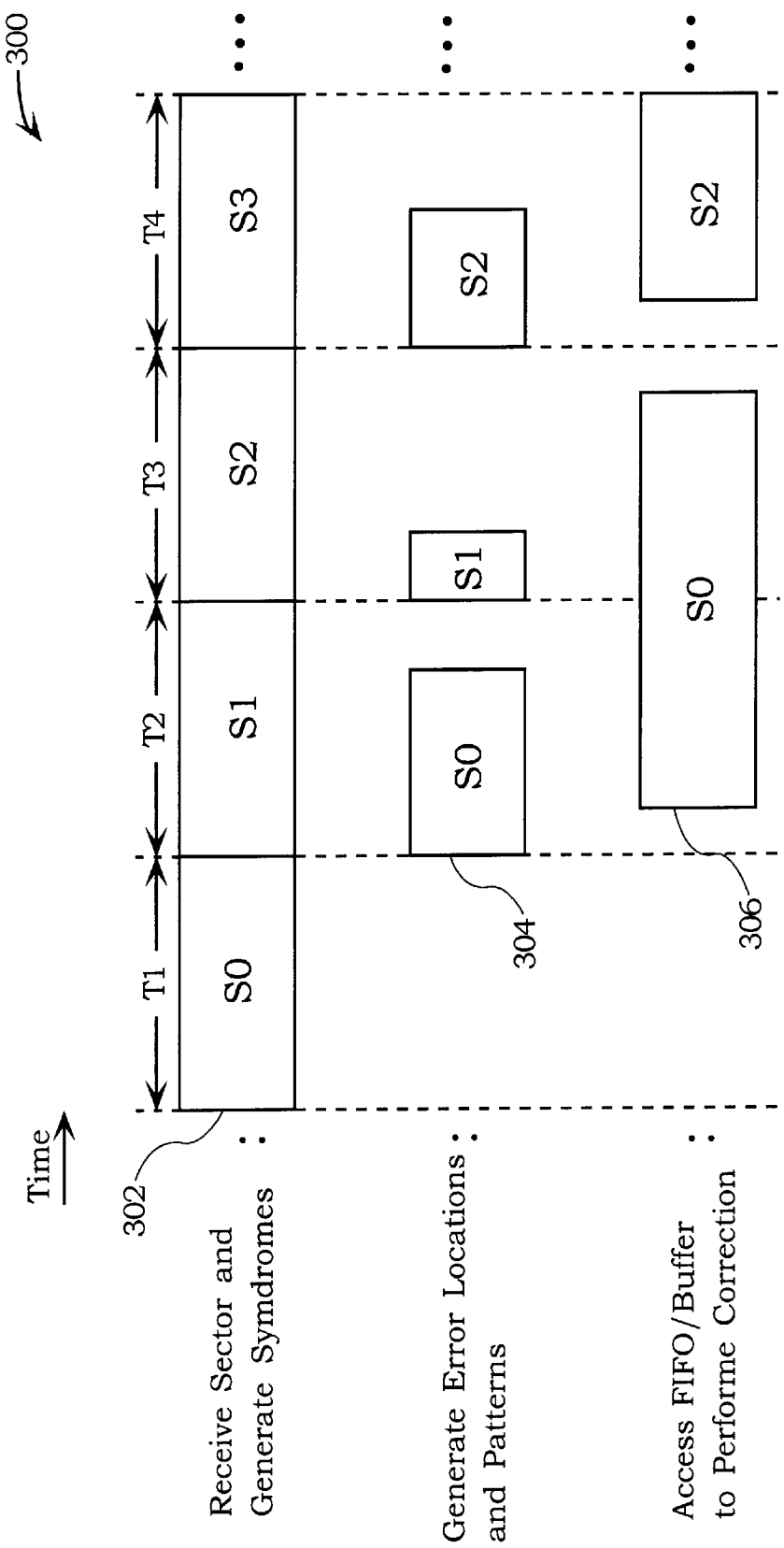
FIG. 3 shows a block timing diagram illustrating extended error correction for an exemplary sector, S0, beyond one sector time.

FIG. 3 shows a block timing diagram 300 illustrating extended error correction for an exemplary sector, S0, beyond one sector time. The timing diagram 300 depicts three rows 302, 304, and 306. The first row 302 shows time blocks corresponding to receiving a sequence of sectors S0, S1, S2, S3, etc. and generating syndromes for each of the sectors. Sector times T1, T2, T3, and T4 are associated with the time duration of receiving and generating syndromes for sectors S0, S1, S2, and S3, respectively. For example, the ECC decoder 210 receives sector S0 and generates syndromes during sector time T1. Then, the ECC decoder 210 receives the next sector S1 and generates syndromes associated with sector S1 during sector time T2.

With continuing reference to FIG. 3, the second row 304 illustrates time blocks associated with generating error locations and patterns. In addition, the control information bits can also be generated during these time blocks. The third row 306 shows time blocks corresponding to accessing the FIFO for performing error correction in the buffer 212. After the ECC decoder 210 has received the sector S0 and generated syndromes during sector time T1, the ECC decoder 210 receives the next sector S1 and generates syndromes during sector time T2. The exemplary sector S0 represents a sector with substantial number of errors, thereby requiring an extended correction time. During sector time T2, the ECC decoder 210 generates error locations and patterns for sector S0 using the syndromes generated in sector time T1. As error locations and patterns are generated for sector S0 during sector time T2, the generated error locations and patterns together with the control information bits are used to access the corrupted data of the sector S0 stored in the buffer 212 for error correction on the corrupted data. The error correction process of accessing the FIFO/buffer extends from sector time T2 through a substantial portion of sector time T3.

In a preferred embodiment, the generation of error locations and patterns occurs within the next sector time. That is, the error patterns and locations for sectors S0, S1, and S2 are determined during sector times T2, T3, and T4, respectively. The error correction, on the other hand, may extend beyond the next sector time. For example, the error correction time for accessing the FIFO and the buffer 212 and performing correction for sector S0 extends from sector time T2 through T3. In contrast, the sector S1 illustrates a sector that contains no error and thus does not require access to the buffer 212 for correction in the next sector time T3. Sector S2 illustrates a sector having errors that can be corrected within the next sector time T4.

Figure 4:
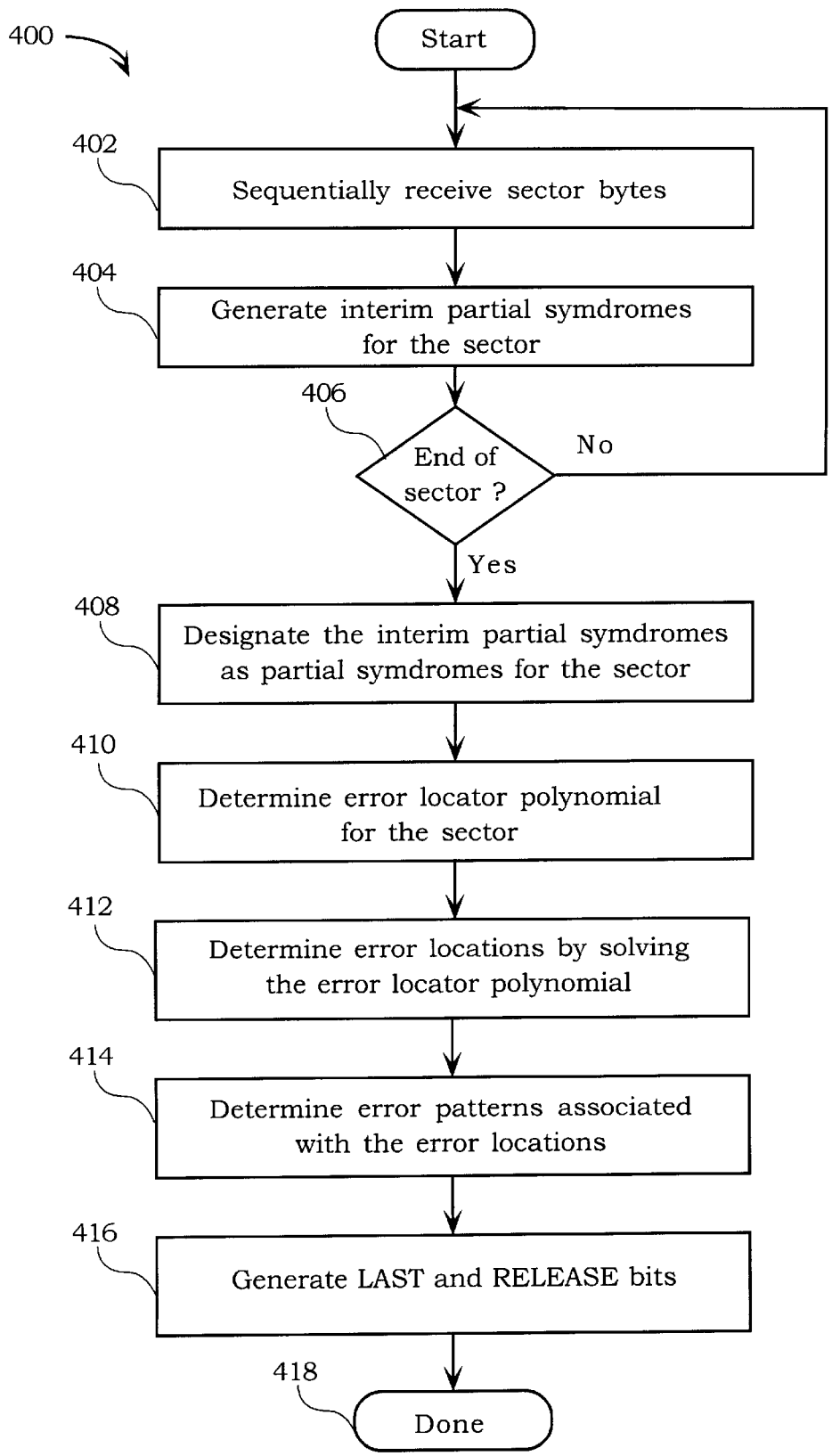
FIG. 4 illustrates a flow diagram of the method for generating error locations, error patterns, and control information bits.

FIG. 4 illustrates a flow diagram of the method 400 for generating error locations, error patterns, and control information bits. In operation 402, the ECC decoder 210 sequentially receives sector bytes. Then in operation 404, the ECC decoder 210 generates interim partial syndromes for the sector based on the sector bytes received thus far. The disk manager 208 determines, in operation 406, whether a sector byte received is the last byte of the sector, i.e., end of the sector. If not, the method proceeds back to operation 402 to receive the next sector byte. If the byte is the last byte of the sector in operation 406, the method proceeds to operation 408, where the ECC decoder 210 designates the interim partial syndromes as partial syndromes for the sector.

In operation 410, the ECC decoder 210 determines an error locator polynomial for the sector using error locator algorithms such as Berlekamp-Massey algorithm. The method in operation 412 then determines error locations by solving the error locator polynomial using error locator polynomial solving algorithms (e.g., Chien algorithm). In operation 414, the ECC decoder 210 determines error patterns associated with the error locations by solving error pattern generating algorithms such as Forney algorithm. Then in operation 416, the method 400 generates a LAST bit and a RELEASE bit. The LAST bit indicates the end of current sector and thus triggers the current active EOS pointer to be retired or replaced by a new last byte address of a sector. The RELEASE bit is set when the sector associated with the LAST bit should not be released to the host computer 214 for such events as the detection of uncorrectable errors in the sector. The method 400 then terminates in operation 418.

Figure 5:
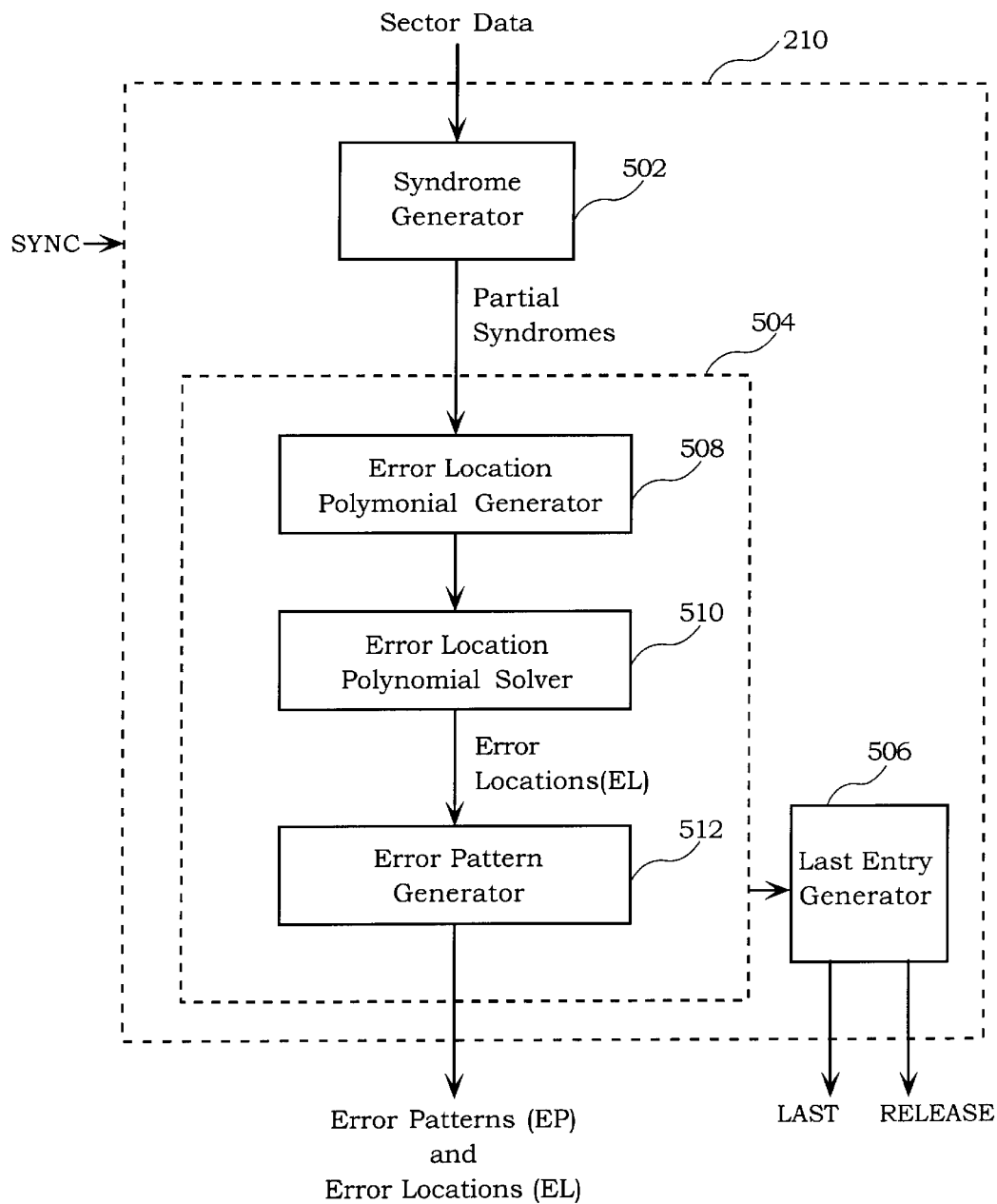
FIG. 5 illustrates a block diagram of an ECC decoder in accordance with one embodiment of the present invention.

FIG. 5 illustrates a more detailed block diagram of the ECC decoder 210 in accordance with one embodiment of the present invention. Specifically, the ECC decoder 210 includes a syndrome generator 502, an error location and pattern generator 504, and a last entry generator 506. The syndrome generator 502 is coupled to the disk manager 208 to sequentially receive the bytes of the identified sequence of sectors on-the-fly. As each of the bytes of an identified sector (e.g., S0) is received sequentially, the syndrome generator 502 generates interim partial syndromes for all the bytes of the sector (e.g., S0) received up to that point in time. When all the bytes of the identified sector have been received, the syndrome generator 502 generates a final set of interim partial syndromes, which are used as partial syndromes for the entire sector (e.g., S0). Syndrome generators using linear feedback shift registers are well known in the art and are typically include linear feedback shift registers. For example, exemplary syndrome generators are described in a co-pending U.S. patent application Ser. No. 09/087,433 filed on an even day herewith, entitled "RAM Based Error Correction Code Encoder and Syndrome Generator with Programmable Interleaving Degrees," by inventor Honda Yang, assigned to the assignee of the present application, which is incorporated herein by reference in its entirety.

The error location and pattern generator 504 is coupled to the syndrome generator 502 to receive the generated partial syndromes. From the generated syndromes, the error location and pattern generator 504 generates error locations (EL), error patterns (EP), and the control information bits (e.g., LAST and RELEASE bits) for the received sector during the next sector time. That is, the error location and pattern generator 504 generates EL, EP, and the control information bits for the previously received sector. At the same time, the ECC decoder 210 receives the next sector and generates the associated interim syndromes.

Internally, the error location and pattern generator 504 includes an error location polynomial generator 508, an error location polynomial solver 510, and an error pattern generator 512. The error locator polynomial generator 508 receives the partial syndromes from the syndrome generator 502 and determines an error locator polynomial for the sector associated with the partial syndromes. The error locator polynomial solver 510 is coupled to the error location polynomial generator 508 to receive the error locator polynomial. The error locator polynomial solver 510 generates error locations in the received sector. The error pattern generator 512 is coupled to receive the error locations (EL) from the error locator polynomial solver 510. The error pattern generator 512 computes error patterns (EP) in the sector corresponding to the partial syndromes.

As will be discussed below, the error locations and the error patterns are used to correct corrupted data in the sector stored in the buffer 212. The error patterns associated with the error locations form a part of an entry into the FIFO buffer along with associated control information bits. Error location polynomial generators, error location polynomial solvers, and error pattern generators are well known in the art.

In response to the error locations and error patterns, the last entry generator 506 generates a pair of the control information bits (i.e., signals), LAST and RELEASE bits, which are associated with the entry including the associated pair of error locations (EL) and patterns (EP). Specifically, the last entry generator 506 communicates with the error location and pattern generator 504 to detect the last EL and EP of a current sector and asserts a signal to set the LAST bit. The RELEASE bit is reset when the sector associated with the RELEASE bit should not be released to the host computer 214 for such events as the detection of uncorrectable errors in the sector. When a sector has no error, however, as indicated by zero syndromes, the last entry generator 506 preferably generates a LAST bit to indicate the end of the sector and sets the RELEASE bit for release of the sector to the host computer 214. Further, the EP entry is forced to zero with the error-free sector. The generated error location, error pattern, and control information bits forming an entry for the FIFO buffer are then transmitted to the ECC extend circuitry 220.

Figure 6:
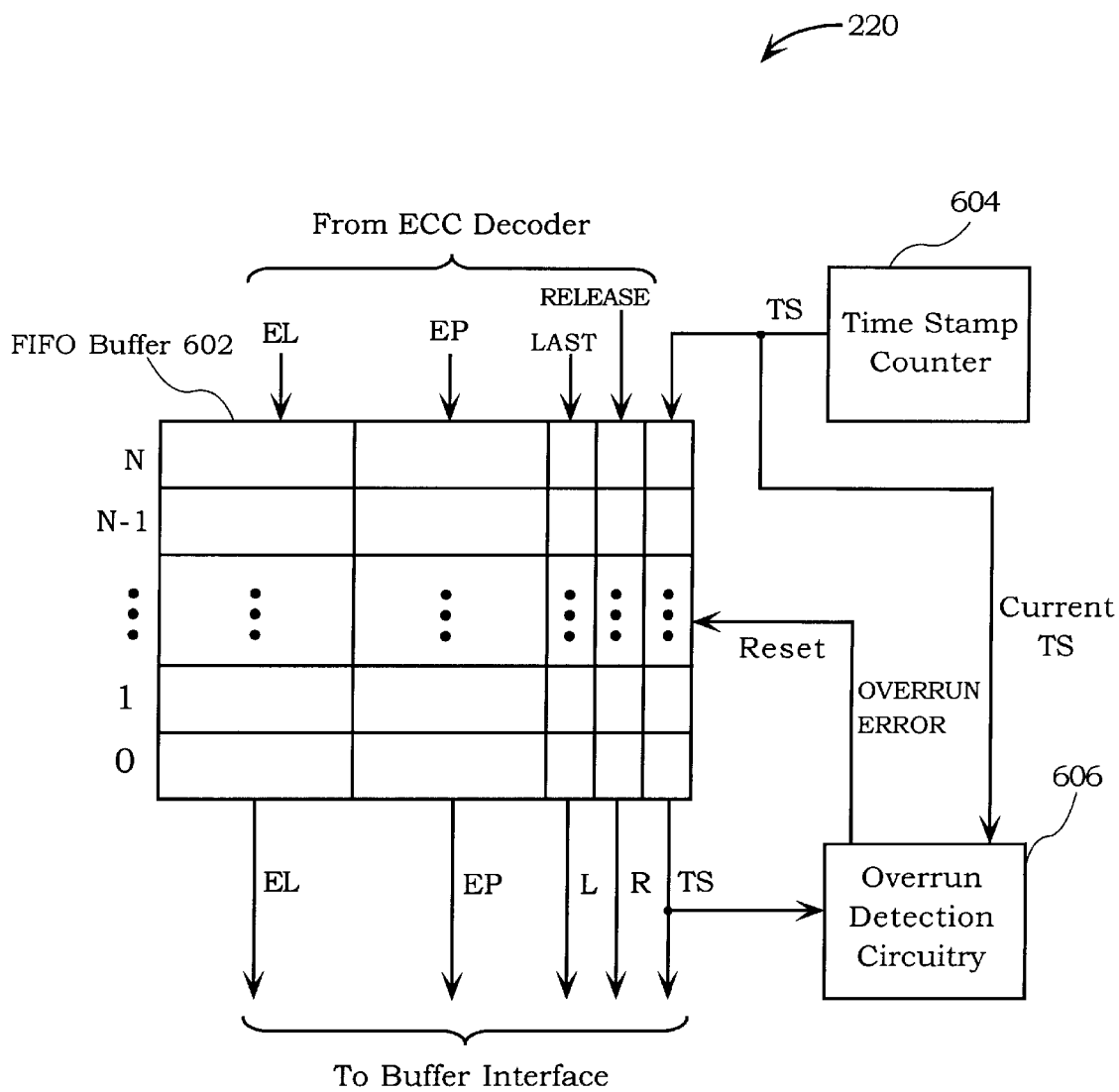
FIG. 6 illustrates a block diagram of an ECC extend circuitry for decoupling the ECC decoder from a buffer.

FIG. 6 illustrates a more detailed block diagram of the ECC extend circuitry 220 for decoupling the ECC decoder 210 from the buffer 212. The ECC extend circuitry 220 is coupled to the ECC decoder 210 to receive the generated error location, error pattern, and control information bits as an entry into the FIFO buffer. The ECC extend circuitry 220 includes a FIFO buffer 602, a time stamp counter 604, and overrun detection circuitry 606. The time stamp counter 604 generates a time stamp signal TS for each of the sectors in sequence. In one embodiment, the time stamp counter 604 is a modulo-3 counter. When a sector is read in, the time stamp counter 604 assigns a 2-bit time stamp label to the sector. The time stamp counter 604 is initially set to 2 and counts down according to a modulo-3 counting scheme, which is well known in the art. For example, the modulo-3 counter counts and assigns a time stamp label TS to the sectors in repeating sequences of 2, 1, and 0. Although the present invention employs a modulo-3 counter to extend error correction up to two sector times, it should be appreciated that other counting schemes (e.g., modulo-4, modulo-5 counters, etc.) may also be utilized to assign a time stamp label to extend error correction beyond two sector times.

After a time stamp label has been generated for a sector, the time stamp counter 604 transmits the time stamp signal TS to the FIFO buffer 602 for all entries generated for the associated sector. That is, a time stamp is included in each of the entries in the FIFO buffer 602 as control information bits and is associated with the error locations (EP), error patterns (EL), and LAST and RELEASE bits in the same entry. In this configuration, the time stamp associates the error patterns and locations to the sector for which the error patterns and locations have been generated.

When the ECC extend circuitry 220 receives an entry of EL, EP, LAST and RELEASE signal bits from the ECC decoder 210, it stores the entry into the FIFO buffer 602. Synchronously, the time stamp counter 604 transmits a time stamp TS for the sector associated with the received entry. In this fashion, a series of entries are pushed into the FIFO buffer 602. The FIFO buffer 602 may accommodate up to N+1 entries, from 0 through N. For each entry, the FIFO buffer 602 includes five fields: an error location (EL) field, an error pattern (EP) field, a LAST bit field, a RELEASE bit field, and a time stamp (TS) field.

In a preferred embodiment of the present invention, the size of the FIFO buffer 602 is 24×23 bits (i.e., 69 bytes). In this arrangement, the FIFO buffer 602 can store up to twenty-four entries. In accordance with one embodiment, each entry consists of twenty-three bits: an 11-bit error location field, an 8-bit error pattern field, a 1-bit LAST bit field, a 1-bit RELEASE bit field, and a 2-bit time stamp TS field. Those skilled in the art will readily appreciate that the FIFO buffer 602 of the present invention can also be implemented using other suitable buffer and field sizes.

When an entry has been pushed (i.e., stored) into the FIFO buffer 602, the entry of data in the FIFO buffer 602 is eventually released to perform error correction on the corrupted data stored in the buffer 212 in accordance with the well known FIFO scheme. When the buffer 212 becomes accessible for error correction, the entry first pushed into the FIFO buffer 602 among the entries still in the FIFO buffer 602 is released or transmitted to the buffer access unit 216 for error correction. In the FIFO configuration, the first-in entry is released before the other entries in the FIFO. As an entry is released for error correction, the FIFO buffer 602 may continuously receive new entries from the ECC decoder 210 and the time stamp counter 604.

Once an entry from the FIFO buffer 602 is transmitted to the buffer access unit 216 for error correction, the time stamp TS of the entry is also transmitted to the overrun detection circuitry 606, which is coupled to the FIFO buffer 602. The overrun detection circuitry 606 is also coupled to the time stamp counter 604 to receive the current time stamp bit signals. The overrun detection circuitry 606 receives and compares the time stamp TS of the released FIFO entry (e.g., entry 0) and the current time stamp TS from the time stamp counter 604 to determine whether the difference is more than a specified sector extension time, thus resulting in correction overrun. For example, in a preferred embodiment, the time stamp counter 604 is a modulo-3 counter. In this modulo-3 counter arrangement, the difference between the time stamp TS of the released FIFO entry and the current time stamp TS in the time stamp counter 604 is computed in accordance with the following formula: (FIFO time stamp TS−current time stamp TS) mod 3. If the difference is greater than 1, the overrun detection circuitry 606 generates a correction overrun error signal, which is used to reset the FIFO buffer 602 and to terminate error correction on the corrupted data from the buffer 212.

Figure 7:
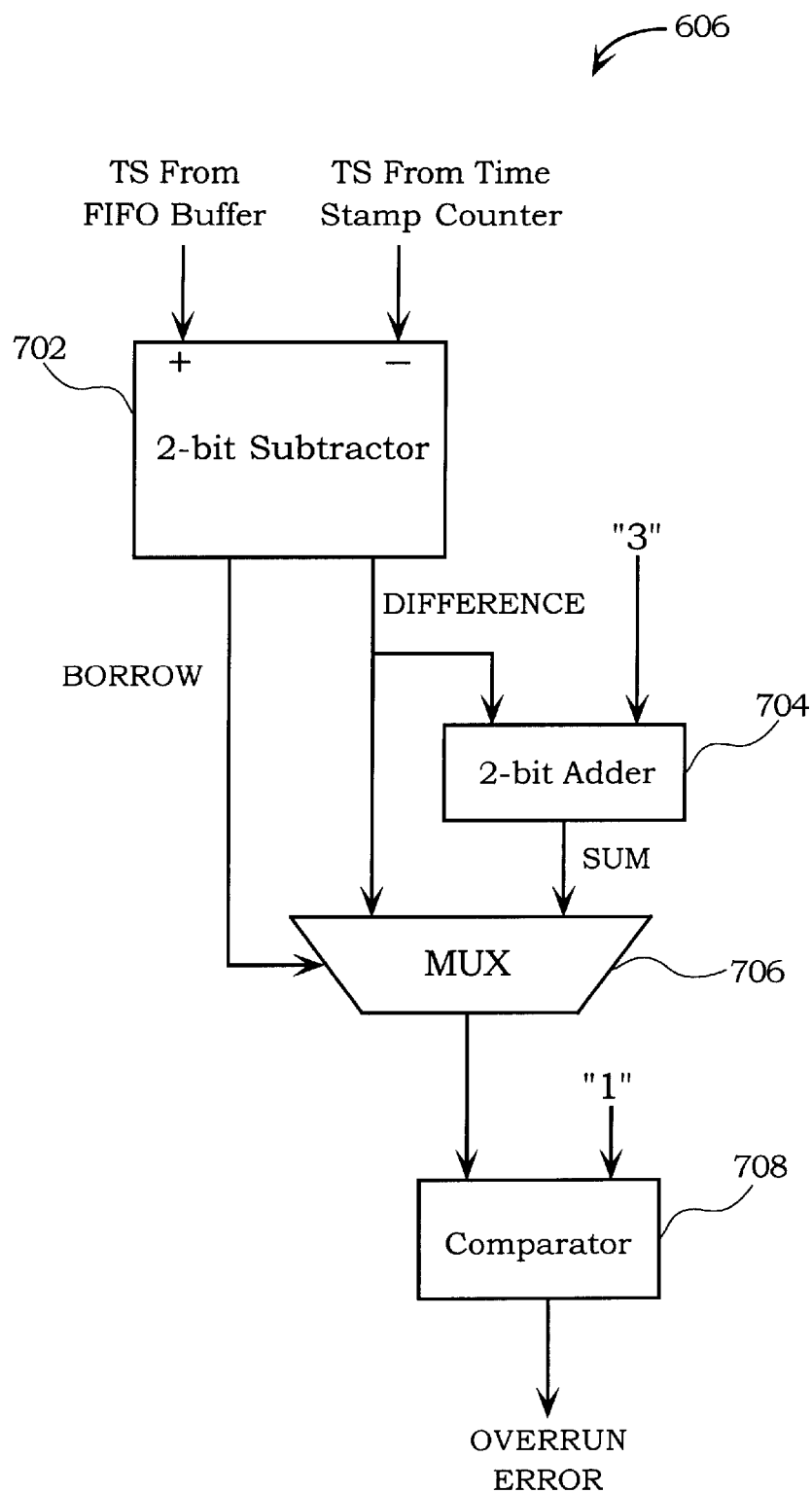
FIG. 7 illustrates exemplary overrun detection circuitry operating in modulo-3 mode in accordance with one embodiment of the present invention

FIG. 7 illustrates exemplary overrun detection circuitry 606 operating in a modulo-3 mode in accordance with one embodiment of the present invention. The modulo-3 overrun detection circuitry 606 includes a 2-bit subtractor 702, a 2-bit adder, a multiplexer 706, and a comparator 708. The 2-bit subtractor 702 receives a time stamp TS from the FIFO buffer 602 and a current time stamp TS from the time stamp counter 604 and generates a borrow bit, BORROW, and 2-bit difference, DIFFERENCE. The 2-bit adder 704 is coupled to the 2-bit subtractor to receive the 2-bit DIFFERENCE and a constant value "3."

The 2-bit adder 704 adds the 2-bit DIFFERENCE and the constant value "3" to generate a 2-bit sum, SUM. In this process, the carry-out bit of the adder 704 is disregarded. The multiplexer 706 is coupled to the 2-bit subtractor to receive the 2-bit DIFFERENCE and is also coupled to the 2-bit adder 704 to receive SUM. In addition, the multiplexer 706 receives the borrow bit from the 2-bit subtractor 702 as a control signal in selecting either DIFFERENCE or SUM as an output. The selected output (either DIFFERENCE or SUM) is then transmitted to the comparator 708. The comparator 708 also receives a constant value "1" as an input. The comparator 708 compares the selected output with the constant value "1." If the selected output is greater than "1," the comparator generates an overrun error signal, OVERRUN ERROR.

Figure 8:
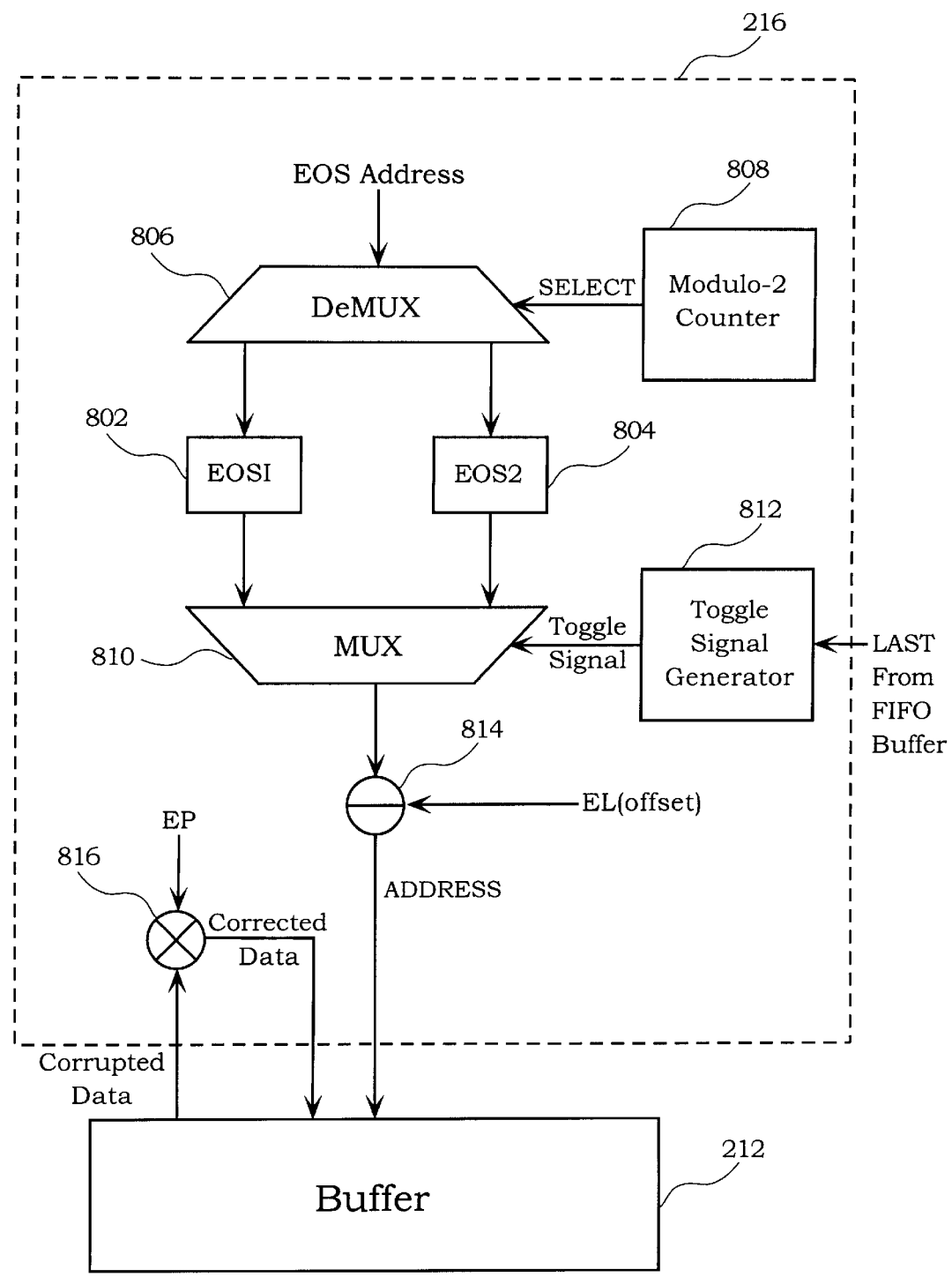
FIG. 8 illustrates a more detailed schematic diagram of a buffer access for performing extended error correction on corrupted data stored in the buffer.

FIG. 8 illustrates a more detailed schematic diagram of the buffer access unit 216 for performing extended error correction on corrupted data stored in the buffer 212. The buffer access unit 216 includes a pair of registers, EOS1 802 and EOS2 804, a demultiplexer 806, a modulo-2 counter 808, a multiplexer 810, a toggle signal generator 812, a subtractor 814, and an Exclusive-OR (XOR) gate 816. The buffer access unit 216 generates an EOS address (e.g., last byte addresses) for each of the sectors as the sector bytes are being received and transmitted to the buffer 212 for storage. The demultiplexer 806 receives the EOS address and routes the EOS address to either the EOS1 register 802 or the EOS2 register 804 in response to a control signal SELECT. In accordance with a preferred embodiment, the control signal SELECT routes the EOS addresses for the even sectors (e.g., S0, S2, S4, etc.) to one of the EOS registers and the EOS addresses for the odd sectors (e.g., S1, S3, S5, etc.) to the other EOS register to implement a "ping-pong" routing scheme described above.

In one embodiment, the modulo-2 counter 808 counts each of the received sectors and generates a control signal of 0 or 1 in accordance with well known modulo-2 counting schemes. The control signal is then transmitted to the demultiplexer 806, which is coupled to the modulo-2 counter to receive the control signal. For example, the modulo-2 counter generates control signal of 0 for the last byte addresses of the even sectors and control signal of 1 for the last byte addresses of the odd sectors. In response to the control signal, the demultiplexer routes an EOS address to one of the EOS registers 802 or 804. Accordingly, one of the EOS registers 802 or 804 is loaded with an EOS address at the end of receiving (i.e., reading) a sector.

The multiplexer 810 is coupled to the EOS1 register 802 and EOS2 register 804 to receive the stored EOS addresses. In response to the LAST bit of a released entry from the FIFO buffer 602, the multiplexer 810 selects one of the EOS addresses in the EOS registers 802 and 804 for output. In one embodiment, a toggle signal generator 812 is coupled to the multiplexer 810 to generate a toggle signal responsive to the LAST bit of the released entry from the FIFO buffer 602. The toggle signal generator 812 generates a control signal that toggles or changes state (e.g., from 0 to 1 or from 1 to 0) whenever the LAST bit from the released FIFO buffer 602 entry indicates that the entry is the last entry for the associated sector.

In a preferred embodiment, the EOS address selected and output by the multiplexer 810 is the last byte address of the previous sector. The EOS address to the previous sector is then used as a reference address to compute the location of the address of the corrupted data in the next sector. The address of the corrupted data is thus computed from a base address and an offset address. That is, the error location from the released entry is used as an offset while the selected EOS address serves as a base address. In accordance with this addressing scheme, the selected EOS pointer from the multiplexer 810 and the error location (EL) from the released FIFO buffer 602 entry are fed into the substractor 814 to compute the address associated with the corrupted data in the buffer 212. The address generated from the subtractor 814 is then used to access the corrupted data stored in the buffer 212.

Using the generated address, the buffer access unit 216 reads the corrupted data stored in the buffer 212 and feeds the corrupted data into the XOR gate 816. To correct errors in the corrupted data, the buffer access unit 216 also feeds the error pattern (EP) from the released FIFO buffer 602 entry into the XOR gate 816. It should be noted that the error pattern fed into the XOR gate 816 is from the same FIFO buffer 602 entry and hence is associated with the error location used as the offset in computing the buffer 212 address. Using the error pattern, the XOR gate 816 performs XOR operations on the corrupted data and the received error pattern to generate corrected data. The corrected data is then transmitted back to the buffer for storage in the same address in the buffer 212.

Advantageously, the present invention extends error correction time on a sector beyond the time to receive the next sector. Such extension of correction time provides not only more time to perform error corrections but also alleviates the buffer access bottleneck. Furthermore, the device, method, and system of the present invention extends error correction time without the cost of expensive hardware resources by using a relatively small FIFO buffer.

While the present invention has been described in terms of several preferred embodiments, there are alterations, permutations, and equivalents which fall within the scope of this invention. It should also be noted that there are alternative ways of implementing both the method, device, and system of the present invention. It is therefore intended that the following appended claims be interpreted as including all such alterations, permutations, and equivalents as fall within the true spirit and scope of the present invention.

What is claimed is:

1. An error detection and correction device for extending error correction time on a data sector beyond the time to receive a next data sector, the error detection and correction device being coupled to sequentially receive a plurality data sectors from a data storage medium, the device comprising:

a buffer for sequentially receiving and storing the plurality of data sectors from the data storage medium; and error detection and correction circuitry configured to sequentially receive the data sectors for sequentially detecting and correcting errors in each of the received data sectors, wherein the error detection and correction circuitry is configured to extend the time to correct the detected errors in the associated sector that is stored in the buffer beyond the time to receive a next data sector in sequence when correcting the detected errors requires more time than the time to receive the next data sector.

2. The device as recited in claim 1, wherein the error detection and correction circuitry further comprises:

an error correction code (ECC) decoder configured to sequentially receive the data sectors for sequentially detecting the errors in each of the received data sectors;

ECC extend circuitry coupled to the ECC decoder to sequentially receive the detected errors and being configured to extend error correction time for the associated data sector beyond the time to receive the next data sector in sequence; and a buffer access unit coupled to the ECC extend circuitry for accessing the buffer for correcting the detected errors in the associated data sector that is stored in the buffer.

3. The device as recited in claim 2, wherein the data storage medium is a hard disk medium.

4. The device as recited in claim 3, wherein the error detection and correction device extends error correction time on a data sector up to the time needed to receive the next two sectors.

5. The device as recited in claim 2, wherein the ECC decoder further comprises:

a syndrome generator configured to sequentially receive the data sectors for generating partial syndromes for each of the received data sectors on-the-fly;

an error location and pattern generator configured to receive the partial syndromes from the syndrome generator for determining error location and error pattern associated with the detected errors in each of the received data sectors; and a last entry generator coupled to the error location and pattern generator for generating a last entry indicator bit for the error location and error pattern that are generated last in each of the received data sectors.

6. The device as recited in claim 5, wherein each of the data sectors comprises a set of bytes arranged in sequence, the syndrome generator receiving the bytes of each of the data sectors in sequence to generate interim partial syndromes after receiving each byte, wherein the syndrome generator designates the interim partial syndromes generated after receiving the last byte of each of the data sectors as the partial syndromes for each of the sectors.

7. The device as recited in claim 6, wherein error location and pattern generator generates the error locations and error patterns associated with the detected errors for each of the received data sectors while the syndrome generator receives a next data sector in sequence.

8. The device as recited in claim 7, wherein the last entry generator generates the last entry indicator bit while the syndrome generator receives a next data sector in sequence, the last entry indicator bit indicating whether the generated error location and error pattern are the last entry for the associated sector.

9. The device as recited in claim 8, wherein the last entry generator also generates a release indicator bit for releasing the data sector associated with the error location and pattern for further processing.

10. The device as recited in claim 9, wherein the ECC extend circuitry further comprises:

a time stamp counter for assigning a time stamp label to the sector associated with the error location and pattern, and the last entry indicator bit and the release bit;

a first-in-first-out (FIFO) buffer coupled to the ECC decoder and the time stamp counter, the FIFO buffer being configured to receive and store an entry including the time stamp label, the error location and pattern, and the last entry indicator bit and the release bit; and overrun detection circuitry configured to receive and compare the time stamp labels from the FIFO entry and the time stamp counter for generating an overrun error.

11. The device as recited in claim 10, wherein the time stamp counter is a modulo-3 counter.

12. The device as recited in claim 10, wherein the FIFO buffer is configured to store a plurality of entries received from the ECC decoder and the time stamp counter, wherein an entry is released in a FIFO manner.

13. The device as recited in claim 10, wherein the overrun detection circuitry generates the overrun error when the difference between the time stamp labels from the FIFO entry and the time stamp counter is more than a predetermined number.

14. The device as recited in claim 13, wherein the predetermined number is 1.

15. The device as recited in claim 13, the overrun detection circuitry generates the overrun error using modulo-3 arithmetic.

16. The device as recited in claim 13, wherein the overrun error is used to reset the FIFO buffer.

17. The device as recited in claim 13, wherein the FIFO buffer comprises 24 by 23 bits.

18. The device as recited in claim 13, wherein the buffer access unit receives the released entry from the FIFO buffer for accessing the buffer and correcting the errors associated with the released entry.

19. The device as recited in claim 18, wherein the buffer access unit generates an end-of-sector (EOS) address for each of the data sectors that are received and stored in the buffer, wherein the buffer access unit further comprises:

a first EOS register and a second EOS register configured to receive and store the EOS addresses in an alternating manner, wherein the last entry indicator bit is used to select one of the EOS registers when the last entry indicator bit indicates that the released entry is the last entry for the associated sector;

a subtractor configured to receive the error locations from the released entry and the selected EOS register for generating an address of a portion of the data sector stored in the buffer, the portion being associated with the error pattern of the released entry;

an XOR gate configured to receive the error pattern of the released entry for correcting the errors in the data sector stored in the buffer corresponding to the address generated from the subtractor, wherein the XOR gate outputs a corrected portion for storage in the buffer.

20. A method for extending error correction time on a data sector beyond the time to receive a next data sector, wherein a plurality of data sectors are sequentially received from a data storage medium for storage in a buffer, the method comprising:

sequentially receiving and storing a first data sector and detecting a first set of errors in the first data sector;

sequentially receiving and storing a second data sector and detecting a second set of errors in the second data sector;

while receiving the second data sector, determining a first set of error locations and patterns associated with the detected first set of errors in the first data sector;

sequentially receiving and storing a third data sector and detecting a third set of errors in the third data sector; and while receiving the second data sector,
correcting the detected first set of errors in the first data sector;
when correcting the detected first set of errors requires more time than the time to receive the second data sector, extending the time to correct the detected first set of errors in the first data sector beyond the time to receive the second data sector, wherein a second set of error locations and patterns associated with the detected second set of errors in the second data sector is determined while receiving the third data sector.

21. The method as recited in claim 20, wherein each of the first, second, and third set of errors are detected sequentially by generating partial syndromes for the first, second, and third data sectors, respectively.

22. The method as recited in claim 21, wherein each of the first, second, and third data sectors comprises a set of data bytes, wherein the partial syndromes for the first, second, and third sets of errors are determined sequentially and incrementally by generating interim partial syndromes after receiving a byte in the respective data sectors.

23. The method as recited in claim 21, wherein the generating of each of the first and second sets of error location and pattern further comprise generating a last entry indicator bit for indicating whether the associated error location and pattern are the last entry for the associated sector.

24. The method as recited in claim 23, wherein the generating of each of the first and second sets of error location and pattern further comprises generating a release indicator bit for releasing the associated data sector for further processing.

25. The method as recited in claim 23, wherein the generating of each of the first and second sets of error location and pattern further comprises generating a time stamp label for the associated data sector, wherein the associated error location, error pattern, last entry indicator bit, release bit, and time stamp label comprise an entry.

26. The method as recited in claim 25, wherein the storing of each of the first, second, and third data sectors comprises:

determining an end-of-sector (EOS) address for each of the corresponding first, second, and third data sectors, respectively; and storing the EOS addresses of the first and second data sectors in the buffer.

27. The method as recited in claim 26, wherein the correcting of the detected first set of errors further comprises:

storing the entry in a first-in-first-out (FIFO) buffer;

releasing the stored entry in the FIFO buffer in a FIFO manner; and accessing a portion of the stored first data sector corresponding to the error location of the released FIFO entry;

performing correction on the accessed portion of the first data sector; and storing the corrected portion of the first data sector.

28. The method as recited in claim 27, wherein accessing the portion of the stored first data sector comprises:

selecting one of the EOS addresses when the last entry indicator bit from the released FIFO entry indicates that the released entry is the last entry for the associated sector;

receiving the error location of the released FIFO entry;

receiving the selected EOS address;

determining an address of the portion of the first data sector stored in the buffer, the address being associated with the error pattern of the released entry; and accessing the portion of the stored first data sector using the determined address.

29. The method as recited in claim 28, wherein the correction performing further comprises:

receiving the portion of the stored first data sector;

receiving the error pattern of the released FIFO entry;

performing XOR operations on the received portion and the error pattern to generate corrected ; and storing the corrected portion.

30. The method as recited in claim 20, wherein the data storage medium is a hard disk medium.

31. The method as recited in claim 30, wherein the data storage medium is a hard disk medium.

32. An error detection and correction device for extending error correction time on a data sector beyond the time to receive a next data sector, the error detection and correction device being coupled to sequentially receive a plurality data sectors from a data storage medium, the device comprising:

a buffering means for sequentially receiving and storing the plurality of data sectors from the data storage medium; and error detecting and correcting means configured to sequentially receive the data sectors for sequentially detecting and correcting errors in each of the received data sectors, wherein the error detecting and correcting means is configured to extend the time to correct the detected errors in the associated sector that is stored in the buffer beyond the time to receive a next data sector in sequence when correcting the detected errors requires more time than the time to receive the next data sector.

33. The device as recited in claim 32, wherein the error detecting and correcting means further comprises:

an error correction code (ECC) decoding means configured to sequentially receive the data sectors for sequentially detecting the errors in each of the received data sectors;

a correction extending means adapted to sequentially receive the detected errors for extending error correction time for the associated data sector beyond the time to receive the next data sector in sequence; and a buffer accessing means for accessing the buffering means for correcting the detected errors in the associated data sector that is stored in the buffering means.

34. The device as recited in claim 33, wherein the ECC decoding means further comprises:

a syndrome generating means configured to sequentially receive the data sectors for generating partial syndromes for each of the received data sectors on-the fly;

an error location and pattern generating means configured to receive the partial syndromes from the syndrome generating means for determining error location and error pattern associated with the detected errors in each of the received data sectors; and a last entry generating means for generating a last entry indicator bit for the error location and error pattern that are generated last in each of the received data sectors.

35. The device as recited in claim 34, wherein each of the data sectors comprises a set of bytes arranged in sequence, the syndrome generating means receiving the bytes of each of the data sectors in sequence to generate interim partial syndromes after receiving each byte, wherein the syndrome generating means designates the interim partial syndromes generated after receiving the last byte of each of the data sectors as the partial syndromes for each of the sectors.

36. The device as recited in claim 35, wherein error location and pattern generating means generates the error locations and error patterns associated with the detected errors for each of the received data sectors while the syndrome generating means receives a next data sector in sequence.

37. The device as recited in claim 36, wherein the last entry generating means generates the last entry indicator bit while the syndrome generating means receives a next data sector in sequence, the last entry indicator bit indicating whether the generated error location and error pattern are the last entry for the associated sector.

38. The device as recited in claim 36, wherein the last entry generating means also generates a release indicator bit for releasing the data sector associated with the error location and pattern for further processing.

39. The device as recited in claim 38, wherein the correction extending means further comprises:

a time stamp counter for assigning a time stamp label to the sector associated with the error location and pattern, and the last entry indicator bit and the release bit;

a first-in-first-out (FIFO) buffer coupled to the ECC decoder and the time stamp counter, the FIFO buffer being configured to receive and store an entry including the time stamp label, the error location and pattern, and the last entry indicator bit and the release bit; and overrun detecting means configured to receive and compare the time stamp labels from the FIFO entry and the time stamp counter for generating an overrun error.

40. The device as recited in claim 39, wherein the time stamp counter is a modulo-3 counter.

41. The device as recited in claim 39, wherein the FIFO buffer is configured to store a plurality of entries received from the ECC decoding means and the time stamp counter, wherein an entry is released in a FIFO manner.

42. The device as recited in claim 39, wherein the overrun detecting means generates the overrun error when the difference between the time stamp labels from the FIFO entry and the time stamp counter is more than a predetermined number.

43. The device as recited in claim 42, wherein the predetermined number is 1.

44. The device as recited in claim 42, wherein the buffer accessing means receives the released entry from the FIFO buffer for accessing the buffering means and for correcting the errors associated with the released entry.

45. The device as recited in claim 42, wherein the buffer accessing means generates an end-of-sector (EOS) address for each of the data sectors that are received and stored in the buffering means, wherein the buffer accessing unit further comprises:

a first EOS register and a second EOS register configured to receive and store the EOS addresses in an alternating manner, wherein the last entry indicator bit is used to select one of the EOS registers when the last entry indicator bit indicates that the released entry is the last entry for the associated sector;

a subtractor configured to receive the error locations from the released entry and the selected EOS register for generating an address of a portion of the data sector stored in the buffer, the portion being associated with the error pattern of the released entry;

an XOR gate configured to receive the error pattern of the released entry for correcting the errors in the data sector stored in the buffer corresponding to the address generated from the subtractor, wherein the XOR gate outputs a corrected portion for storage in the buffer.

46. The device as recited in claim 32, wherein the data storage medium is a hard disk medium.

47. The device as recited in claim 46, wherein the error detection and correction device extends error correction time on a data sector up to the time needed to receive the next two sectors.

48. A system for extending error correction time on a data sector of an error correction coded data stream beyond the time to receive a next data sector, wherein the error correction coded data stream is read from a data storage medium and comprises a plurality of data sectors, the system comprising:

disk manager circuitry configured to receive the data stream for sequentially identifying the plurality of data sectors in the data stream;

a buffer coupled to the disk manager circuitry for sequentially receiving and storing the plurality of data sectors from the data storage medium; and error detection and correction circuitry configured to sequentially receive the data sectors from the disk manager circuitry for sequentially detecting and correcting errors in each of the received data sectors, wherein the error detection and correction circuitry is configured to extend the time to correct the detected errors in the associated sector that is stored in the buffer beyond the time to receive a next data sector in sequence when correcting the detected errors requires more time than the time to receive the next data sector.

49. The system as recited in claim 48, wherein the error detection and correction circuitry further comprises:

an error correction code (ECC) decoder configured to sequentially receive the data sectors for sequentially detecting the errors in each of the received data sectors;

ECC extend circuitry coupled to the ECC decoder to sequentially receive the detected errors and being configured to extend error correction time for the associated data sector beyond the time to receive the next data sector in sequence; and a buffer access unit coupled to the ECC extend circuitry for accessing the buffer for correcting the detected errors in the associated data sector that is stored in the buffer.

50. The system as recited in claim 49, wherein the ECC decoder further comprises:

a syndrome generator configured to sequentially receive the data sectors for generating partial syndromes for each of the received data sectors on-the-fly;

an error location and pattern generator configured to receive the partial syndromes from the syndrome generator for determining error location and error pattern associated with the detected errors in each of the received data sectors; and a last entry generator coupled to the error location and pattern generator for generating a last entry indicator bit for the error location and error pattern that are generated last in each of the received data sectors.

51. The system as recited in claim 50, wherein each of the data sectors comprises a set of bytes arranged in sequence, the syndrome generator receiving the bytes of each of the data sectors in sequence to generate interim partial syndromes after receiving each byte, wherein the syndrome generator designates the interim partial syndromes generated after receiving the last byte of each of the data sectors as the partial syndromes for each of the sectors.

52. The system as recited in claim 51, wherein error location and pattern generator generates the error locations and error patterns associated with the detected errors for each of the received data sectors while the syndrome generator receives a next data sector in sequence.

53. The system as recited in claim 52, wherein the last entry generator generates the last entry indicator bit while the syndrome generator receives a next data sector in sequence, the last entry indicator bit indicating whether the generated error location and error pattern are the last entry for the associated sector.

54. The system as recited in claim 53, wherein the last entry generator also generates a release indicator bit for releasing the data sector associated with the error location and pattern for further processing.

55. The system as recited in claim 54, wherein the ECC extend circuitry further comprises:

a time stamp counter for assigning a time stamp label to the sector associated with the error location and pattern, and the last entry indicator bit and the release bit;

a first-in-first-out (FIFO) buffer coupled to the ECC decoder and the time stamp counter, the FIFO buffer being configured to receive and store an entry including the time stamp label, the error location and pattern, and the last entry indicator bit and the release bit; and overrun detection circuitry configured to receive and compare the time stamp labels from the FIFO entry and the time stamp counter for generating an overrun error.

56. The system as recited in claim 55, wherein the FIFO buffer is configured to store a plurality of entries received from the ECC decoder and the time stamp counter, wherein an entry is released in a FIFO manner.

57. The system as recited in claim 56, wherein the buffer access unit receives the released entry from the FIFO buffer for accessing the buffer and correcting the errors associated with the released entry.

58. The system as recited in claim 57, wherein the buffer access unit generates an end-of-sector (EOS) address for each of the data sectors that are received and stored in the buffer, wherein the buffer access unit further comprises:

a first EOS register and a second EOS register configured to receive and store the EOS addresses in an alternating manner, wherein the last entry indicator bit is used to select one of the EOS registers when the last entry indicator bit indicates that the released entry is the last entry for the associated sector;

an subtractor configured to receive the error locations from the released entry and the selected EOS register for generating an address of a portion of the data sector stored in the buffer, the portion being associated with the error pattern of the released entry;

an XOR gate configured to receive the error pattern of the released entry for correcting the errors in the data sector stored in the buffer corresponding to the address generated from the subtractor, wherein the XOR gate outputs a corrected portion for storage in the buffer.

59. The system as recited in claim 48, wherein the data storage medium is a hard disk medium.

60. The device as recited in claim 48, wherein the error detection and correction device extends error correction time on a data sector up to the time needed to receive the next two sectors.

61. An error detection and correction device for extending error correction time on a data sector beyond the time to receive a next data sector, the error detection and correction device being coupled to sequentially receive a plurality data sectors from a data storage medium, the device comprising:

a buffer for sequentially receiving and storing the plurality of data sectors from the data storage medium;

error detection and correction circuitry configured to sequentially receive the data sectors for sequentially detecting and correcting errors in each of the received data sectors, wherein the error detection and correction circuitry includes ECC extend circuitry to sequentially receive the detected errors for extending error correction time for the associated data sector beyond the time to receive the next data sector in sequence when correcting the detected errors requires more time than the time to receive the next data sector; and a buffer access unit coupled to the ECC extend circuitry for accessing the buffer for correcting the detected errors in the associated data sector that is stored in the buffer, wherein the buffer access unit generates an end-of-sector (EOS) address for each of the data sectors that are received and stored in the buffer.

62. The device as recited in claim 61, wherein the error detection and correction circuitry further includes an error correction code (ECC) decoder configured to sequentially receive the data sectors for sequentially detecting the errors in each of the received data sectors.

63. The device as recited in claim 62, wherein the buffer access unit further comprises a first EOS register and a second EOS register configured to receive and store the EOS addresses in an alternating manner, wherein a last entry indicator is used to select one of the EOS registers to retire the EOS address stored in the selected EOS register.

* * * * *